United States Patent
Lai et al.

(10) Patent No.: US 8,106,629 B2
(45) Date of Patent: Jan. 31, 2012

(54) CHARGING METHOD AND DEVICE

(75) Inventors: Ming-Feng Lai, Taichung (TW);
Hsin-Hsiung Chiu, Changhua Hsien (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 499 days.

(21) Appl. No.: 12/115,693

(22) Filed: May 6, 2008

(65) Prior Publication Data

US 2009/0278507 A1    Nov. 12, 2009

(51) Int. Cl.
*H02J 7/00* (2006.01)
*H02J 7/04* (2006.01)
*H02J 7/16* (2006.01)
*H02J 7/24* (2006.01)

(52) U.S. Cl. ........ 320/128; 320/132; 320/152; 320/157; 320/162; 320/164

(58) Field of Classification Search .................. 320/128, 320/162
See application file for complete search history.

(56) References Cited

U.S. PATENT DOCUMENTS

| | | | | |
|---|---|---|---|---|
| 5,442,274 A | * | 8/1995 | Tamai | 320/146 |
| 6,037,751 A | * | 3/2000 | Klang | 320/160 |
| 6,275,006 B1 | * | 8/2001 | Koike et al. | 320/125 |
| 2008/0122399 A1 | * | 5/2008 | Nishino et al. | 320/103 |

* cited by examiner

*Primary Examiner* — Edward Tso
*Assistant Examiner* — Ahmed Omar
(74) *Attorney, Agent, or Firm* — Fox Rothschild, LLP; Robert J. Sacco (57) ABSTRACT

A charging method for a battery includes: enabling a charging device to charge the battery with a first charging voltage having a value that is increasing and a first charging current having a value that is constant; and when it is determined that the value of the first charging voltage is equal to a maximum charging voltage value of the battery, enabling the charging device to charge the battery with a second charging voltage having a value that is equal to a maximum charging voltage value of the battery, and a second charging current having a value that is decreasing. A charging device for realizing the charging method is also disclosed.

11 Claims, 7 Drawing Sheets

CHARGING METHOD AND DEVICE

BACKGROUND OF THE INVENTION

1. Field of the Invention

This invention relates to a charging method and device, more particularly to a relatively efficient charging method and device.

2. Description of the Related Art

Figure 1:
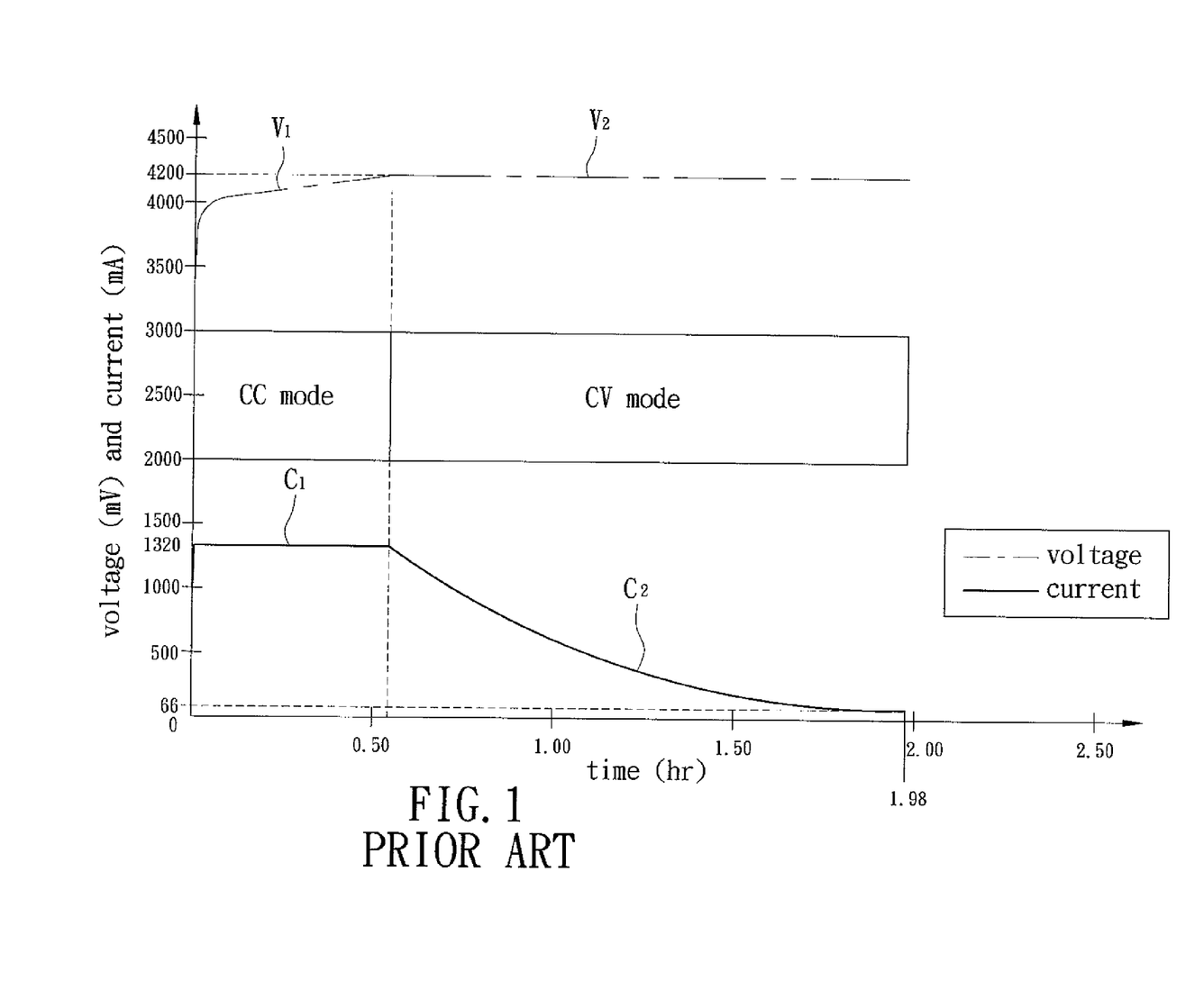
FIG. 1 is a plot illustrating charging voltages and charging currents of a conventional charging device.

As illustrated in FIG. 1, a conventional charging device (not shown) first charges a battery (not shown) in a constant current mode (CC mode). In the CC mode, the conventional charging device charges the battery with a first charging voltage ($V_1$) and a first charging current ($C_1$). The first charging voltage ($V_1$) has a value that is increasing, while the first charging current ($C_1$) has a value that is constant, i.e., 1320 mA. When the conventional charging device determines that the value of the first charging voltage ($V_1$) is equal to a normal charging voltage value of the battery, i.e., 4200 mV, the conventional charging device then charges the battery in a constant voltage (CV mode). In the CV mode, the conventional charging device charges the battery with a second charging voltage ($V_2$) and a second charging current ($C_2$). The second charging voltage ($V_2$) has a value that is equal to the normal charging voltage value of the battery, while the second charging current ($C_2$) has a value that is decreasing.

Although the aforementioned conventional charging device achieves its intended purpose, the conventional charging device is relatively inefficient.

SUMMARY OF THE INVENTION

Therefore, the object of the present invention is to provide a relatively efficient charging method and device for a battery.

According to one aspect of the present invention, a charging method for a battery comprises: enabling a charging device to charge the battery with a first charging voltage and a first charging current, the first charging voltage having a value that is increasing, the first charging current having a value that is constant and that is not greater than a discharge current value of the battery; when it is determined that the value of the first charging voltage is equal to a maximum charging voltage value of the battery, which is greater than a normal charging voltage value of the battery, enabling the charging device to charge the battery with a second charging voltage and a second charging current, the second charging voltage having a value that is equal to the maximum charging voltage value of the battery, the second charging current having a value that is decreasing; when it is determined that the value of the second charging current is not greater than a first predetermined threshold value, which is less than the discharge current value of the battery, enabling the charging device to charge the battery with a third charging voltage and the second charging current, the third charging voltage having a value that is equal to the normal charging voltage value of the battery; and when it is determined that the value of the second charging current is not greater than a second predetermined threshold value, which is less than the first predetermined threshold value, disabling the charging device from charging the battery.

According to another aspect of the present invention, a charging device for a battery comprises a control unit and a charging unit. The control unit is stored with a battery specification therein, the battery specification including a normal charging voltage value, a maximum charging voltage value, and a discharge current value of the battery. The charging unit is coupled to and controlled by the control unit so as to charge the battery in first, second, and third charging modes. In the first charging mode, the charging unit charges the battery with a first charging voltage and a first charging current. The first charging voltage has a value that is increasing. The first charging current has a value that is constant and that is not greater than the discharge current value of the battery. When it is determined by the control unit that the first charging voltage is equal to the maximum charging voltage of the battery, which is greater than the normal charging voltage value of the battery, the charging unit charges the battery in the second charging mode. In the second charging mode, the charging unit charges the battery with a second charging voltage and a second charging current. The second charging voltage has a value that is equal to the maximum charging voltage value of the battery. The second charging current has a value that is decreasing. In the third charging mode, the charging unit charges the battery with a third charging voltage and the second charging current. The third charging voltage has a value that is equal to the normal charging voltage value of the battery.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
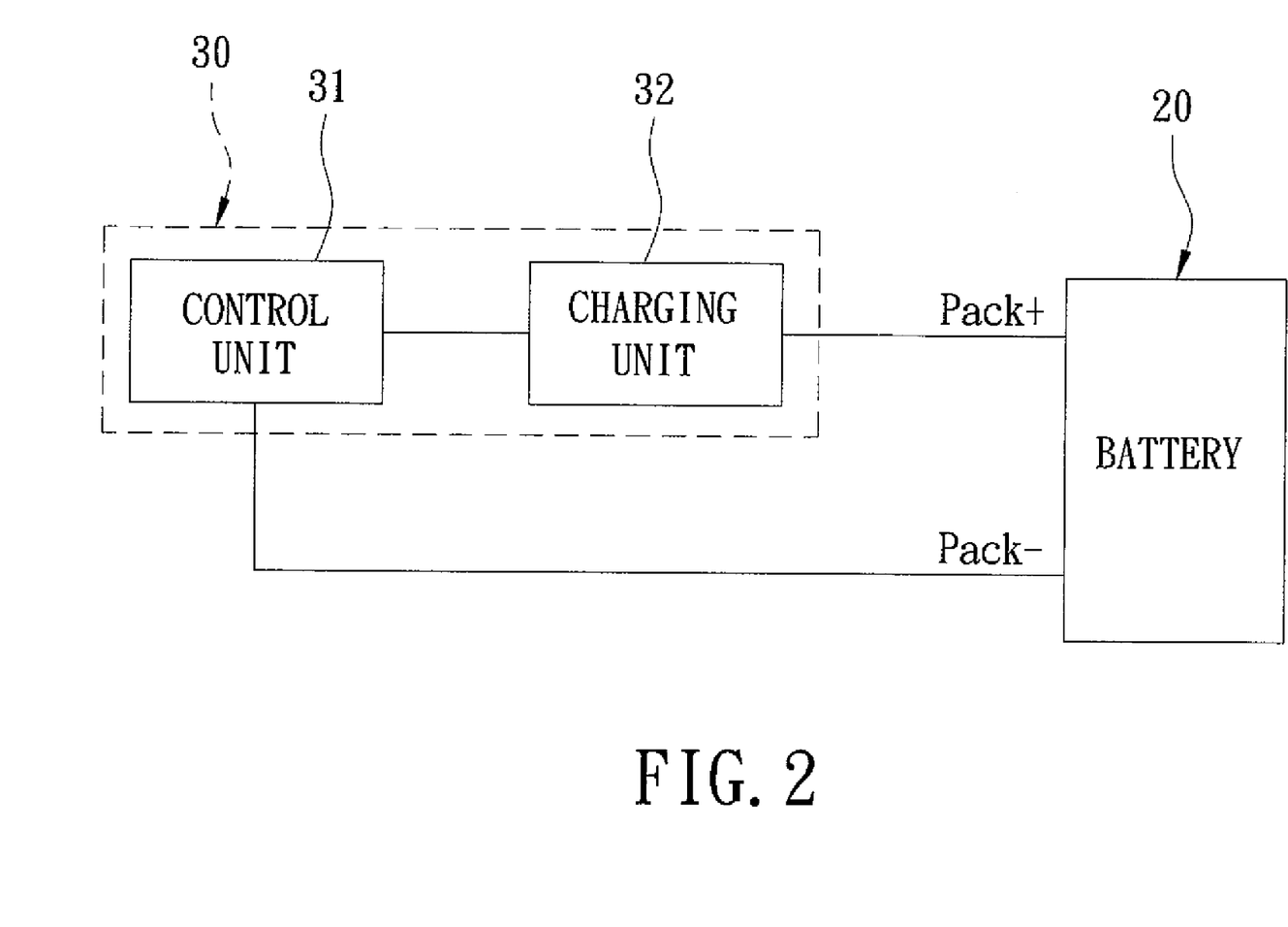
FIG. 2 is a schematic circuit diagram of the preferred embodiment of a charging device according to this invention.

Referring to FIG. 2, the preferred embodiment of a charging device 30 for a battery 20 according to this invention is shown to include a control unit 31 and a charging unit 32.

Figure 3:
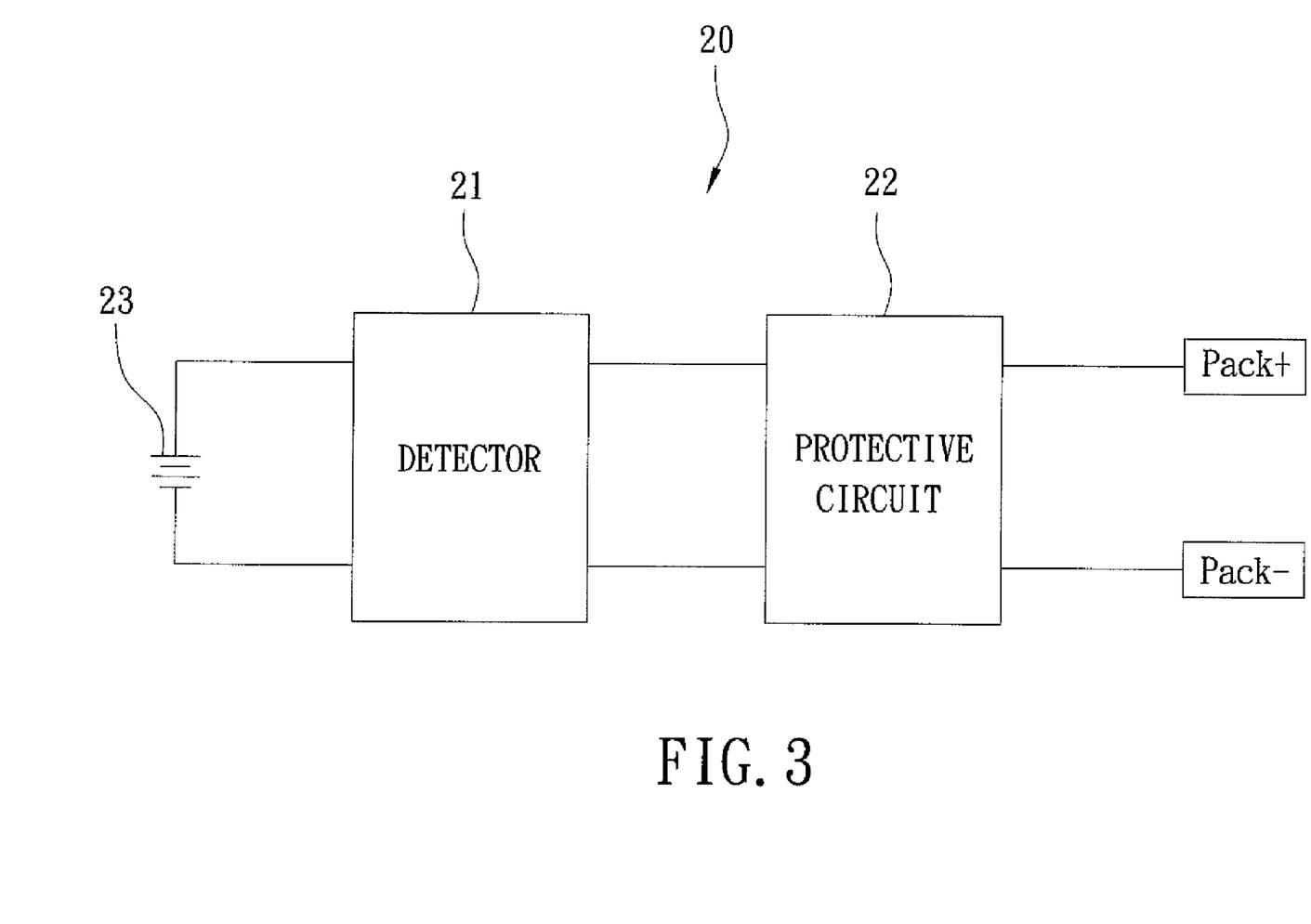
FIG. 3 is a schematic circuit diagram of an exemplary battery to be charged by the preferred embodiment.

The battery 20, as shown in FIG. 3, includes a cell 23, a detector 21, a protective circuit 22, and a pair of external terminals (Pack+, Pack−). The detector 21 is coupled to the cell 23, and is operable so as to detect an actual voltage value and an actual current value of the cell 23. The protective circuit 22 connects the detector 21 to the external terminals (Pack+, Pack−) In this embodiment, the battery 20 is a lithium battery, and has a battery specification of 1320 mAh battery capacity, 4200 mV normal charging voltage, 4250 mV maximum charging voltage, and 1320 mA discharge current.

The charging device 30 is connected across the external terminals (Pack+, Pack−) of the battery 20.

The control unit 31 stores the battery specification of the battery 20 therein.

The charging unit 32 is coupled to and controlled by the control unit 31 so as to charge the battery 20 in first, second, and third charging modes, in a manner that will be described hereinafter.

Figure 4:
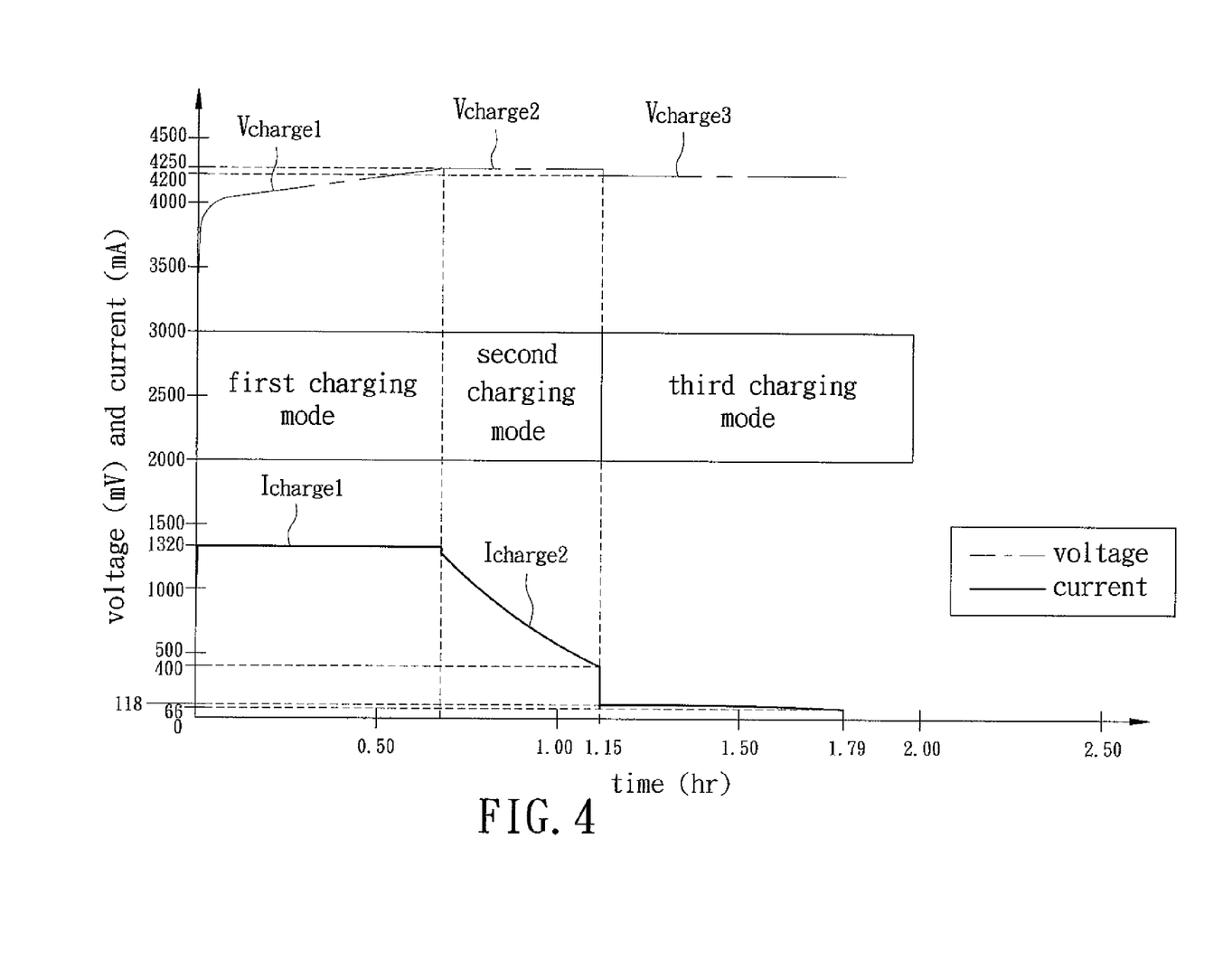
FIG. 4 is a plot illustrating charging voltages and charging currents of the preferred embodiment.

With further reference to FIG. 4, the charging unit 32 first charges the battery 20 in the first charging mode. In the first charging mode, the charging unit 32 charges the battery 20 with a first charging voltage ($V_{charge1}$) and a first charging current ($I_{charge1}$). The first charging voltage ($V_{charge1}$) has a value that is increasing, while the first charging current ($I_{charge1}$) has a value that is constant and that is not greater than the discharge current value of the battery 20. In this embodiment, the value of the first charging current ($I_{charge1}$) is equal to the discharge current value of the battery 20, i.e., 1320 mA. Thereafter, when the control unit 31 determines that the value of the first charging voltage ($V_{charge1}$) is equal to the maximum charging voltage value of the battery 20, the charging unit 32 charges the battery 20 in the second charging mode. In the second charging mode, the charging unit 32 charges the battery 20 with a second charging voltage ($V_{charge2}$) and a second charging current ($I_{charge2}$). The second charging voltage ($V_{charge2}$) has a value that is equal to the maximum charging voltage value of the battery 20, while the second charging current ($I_{charge2}$) has a value that is decreasing. Thereafter, when the control unit 31 determines that the second charging current ($I_{charge2}$) is not greater than a first predetermined threshold value, which is less than the discharge current value of the battery 20, the charging unit 32 charges the battery 20 in the third charging mode. In the third charging mode, the charging unit 32 charges the battery 20 with a third charging voltage ($V_{charge3}$) and the second charging current ($I_{charge2}$) The third charging voltage ($V_{charge3}$) has a value that is equal to the normal charging voltage value of the battery 20. Thereafter, when the value of the second charging current ($I_{charge2}$) is not greater than a second predetermined threshold value, which is less than the first predetermined threshold value, the charging unit 32 is disabled from charging the battery 20.

The control unit 31 is operable so as to obtain the first predetermined threshold value. In particular, the control unit 31 first receives the actual voltage value and the actual current value of the cell 23 of the battery 20 through the detector 21 of the battery 20. Then, the control unit 31, through a first algorithm stored therein, obtains an internal resistance value of the battery 20 based on the value of the first charging voltage ($V_{charge1}$), and the actual voltage value and the actual current value received thereby. Finally, the control unit 31, through a second algorithm stored therein, obtains the first predetermined threshold value based on the maximum charging voltage value, the normal charging voltage value, and the internal resistance value of the battery 20 obtained thereby. In this embodiment, the internal resistance value is equal to a difference between the value of the first charging voltage and the actual voltage value divided by the actual current value. It is noted that the internal resistance value corresponds a resistance value of a resistor ($R_1$) of the detector 21, and resistance values of a fuse (F1) and a pair of transistors (Q1, Q2) of the protective circuit 22. Moreover, in this embodiment, the first predetermined threshold value, i.e., 400 mA, is equal to a difference between the maximum charging voltage value and the normal charging voltage value divided by the internal resistance value.

The control unit 31 further stores the second predetermined threshold value therein. In this embodiment, the second predetermined threshold value, i.e., 66 mA, is equal to one-twentieth of the discharge current value of the battery 20.

Figure 5A:
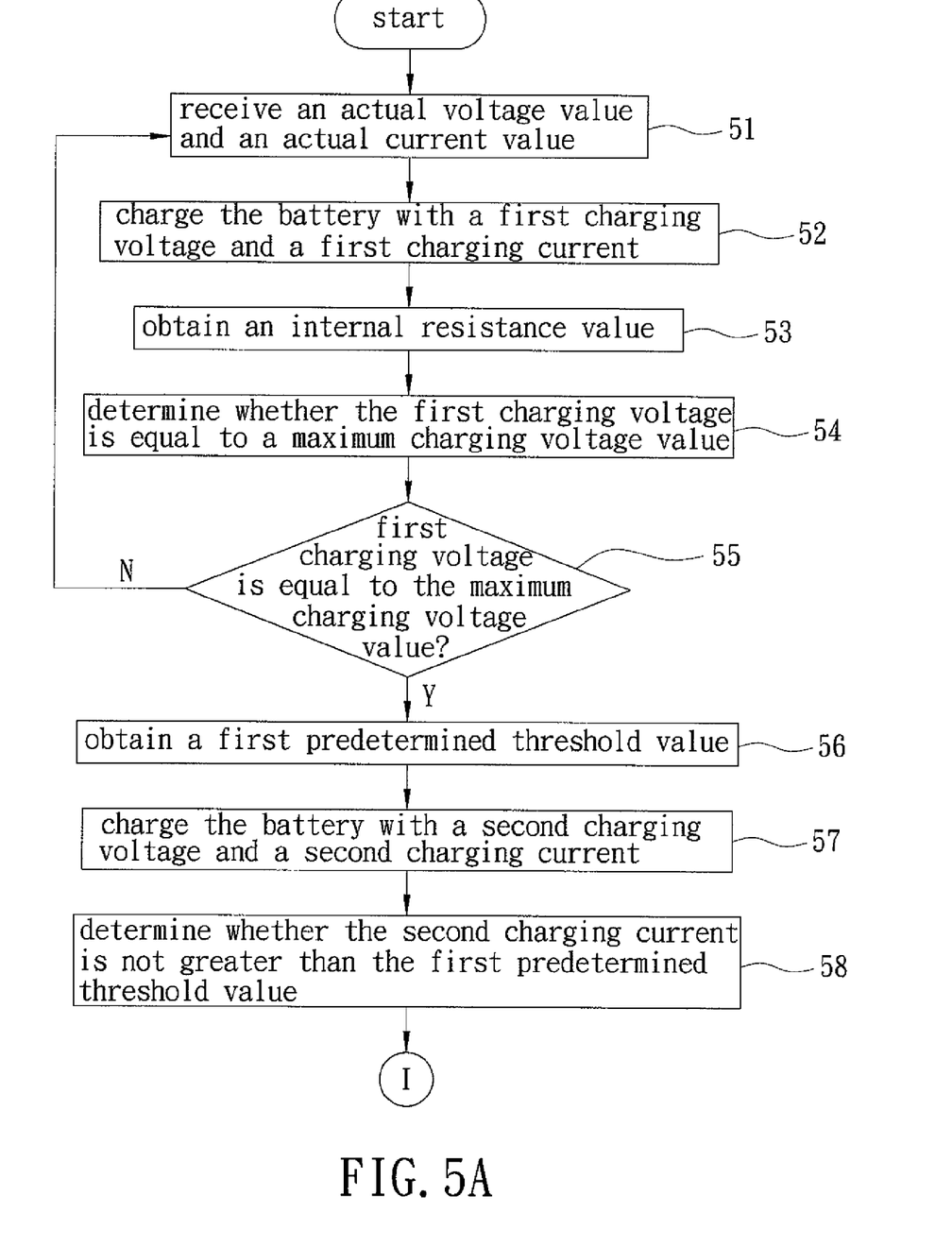
FIGS. 5A and 5B are flowcharts illustrating the preferred embodiment of a charging method according to this invention.
Figure 5B:
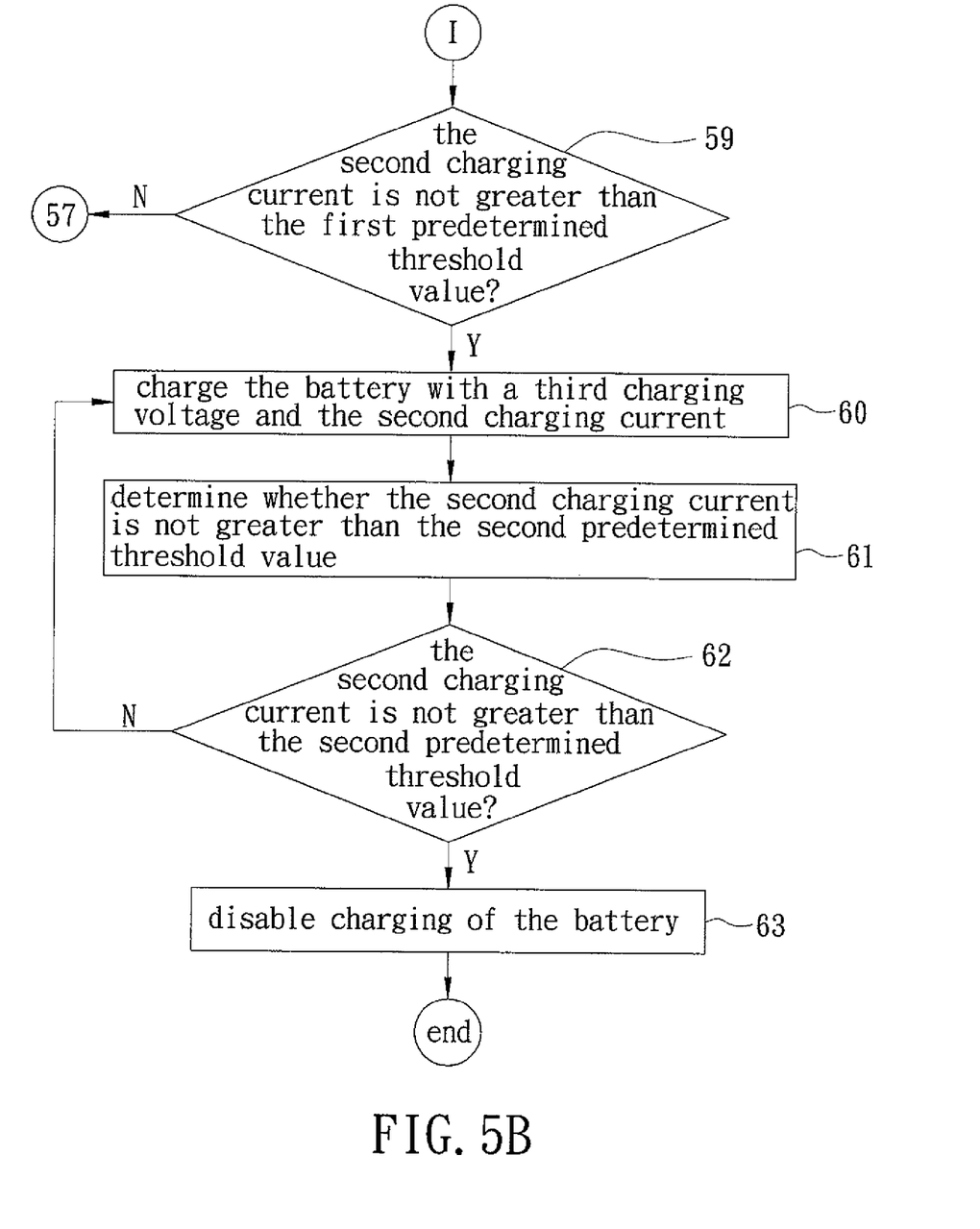

The preferred embodiment of a charging method for the battery 20 to be implemented using the aforementioned charging device 30 according to this invention is described with further reference to FIGS. 5A and 5B.

In step 51, the control unit 31 of the charging device 30 receives the actual voltage value and the actual current value of the cell 23 of the battery 20 from the detector 21 of the battery 20.

In step 52, the charging unit 32 of the charging device 30 charges the battery 20 in the first charging mode. That is, the charging unit 32 of the charging device 30 charges the battery 20 with the first charging voltage ($V_{charge1}$) and the first charging current ($I_{charge1}$).

In step 53, the control unit 31 of the charging device 30 obtains the internal resistance value of the battery 20.

In step 54, the control unit 31 of the charging device 30 determines whether the value of the first charging voltage ($V_{charge1}$) is equal to the maximum charging voltage value of the battery 20.

In step 55, when it is determined in step 54 that the value of the first charging voltage ($V_{charge1}$) is equal to the maximum charging voltage value of the battery 20, the flow proceeds to step 56. Otherwise, the flow goes back to step 51.

In step 56, the control unit 31 of the charging device 30 obtains the first predetermined threshold value.

In step 57, the charging unit 32 of the charging device 30 charges the battery 20 in the second charging mode. That is, the charging unit 32 of the charging device 30 charges the battery 20 with the second charging voltage ($V_{charge2}$) and the second charging current ($I_{charge2}$).

In step 58, the control unit 31 of the charging device 30 determines whether the value of the second charging current ($I_{charge2}$) is not greater than the first predetermined threshold value.

In step 59, when it is determined in step 58 that the value of the second charging current ($I_{charge2}$) is not greater than the first predetermined threshold value, the flow proceeds to step 60. Otherwise, the flow goes back to step 57.

In step 60, the charging unit 32 of the charging device 30 charges the battery 20 in the third charging mode. That is, the charging unit 32 of the charging device 30 charges the battery 20 with the third charging voltage ($V_{charge3}$) and the second charging current ($I_{charge2}$).

In step 61, the control unit 31 of the charging device 30 determines whether the value of the second charging current ($I_{charge2}$) is not greater than the second predetermined threshold value.

In step 62, when it is determined in step 61 that the value of the second charging current ($I_{charge2}$) is not greater than the second predetermined threshold value, the flow proceeds to step 63. Otherwise, the flow goes back to step 60.

In step 63, the charging unit 32 of the charging device 30 is disabled from charging the battery 20.

It is noted that since the charging device 30 of this invention charges the battery 20 with a first charging voltage ($V_{charge1}$) having a value that increases up to the maximum charging voltage value of the battery 20, i.e., 4250 mV, the first charging current ($I_{charge1}$) of the charging device 30 of this invention is maintained at a constant value, i.e., 1320 mA, within a relatively long period of time. As such, the charging device 30 of this invention charges the battery 20 at a faster rate when compared to the prior art.

Figure 6:
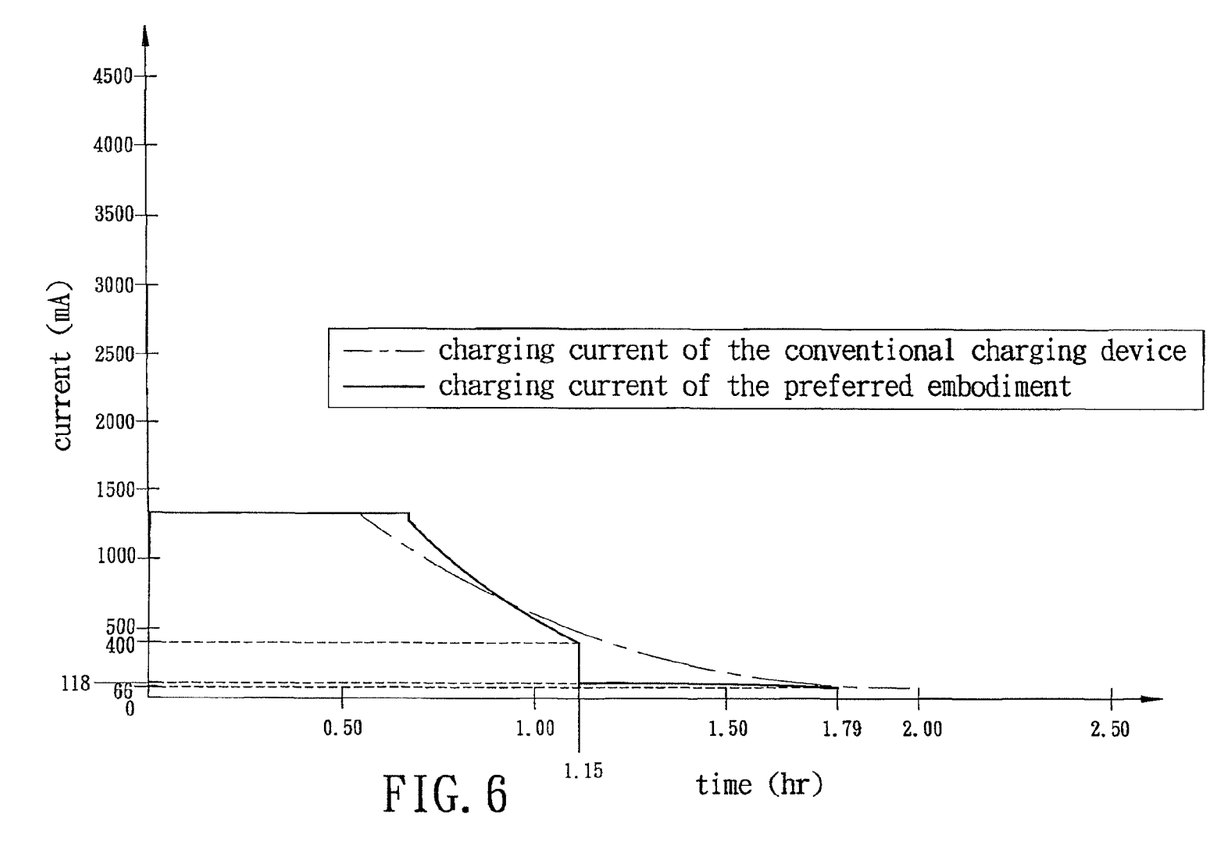
FIG. 6 is a plot illustrating charging currents of the preferred embodiment and the conventional charging device.

In addition, based from experimental results, as illustrated in FIG. 6, when a pair of batteries (not shown), which are in the same initial condition, are respectively charged by the conventional charging device and the charging device of this invention within the same period of time, i.e., 1.15 hours, the battery charged by the charging device of this invention has a battery capacity that is 4% greater than that of the battery charged by the conventional charging device.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A charging method for a battery, comprising:
    A) enabling a charging device to receive an actual voltage value and an actual current value of the battery;
    B) enabling the charging device to charge the battery with a first charging voltage and a first charging current, the first charging voltage having a value that is continuously increasing, the first charging current having a value that is constant and that is not greater than a discharge current value of the battery;
    C) enabling the charging device to obtain an internal resistance value of the battery based on the value of the first charging voltage, and the actual voltage value and the actual current value received in step A);
    D) enabling the charging device to obtain a first predetermined threshold value based on a maximum charging voltage value of the battery and a normal charging voltage value of the battery less than the maximum charging voltage value, and the internal resistance value of the battery obtained in step C), the first predetermined threshold value being less than the discharge current value of the battery;
    E) when it is determined that the value of the first charging voltage is equal to the maximum charging voltage value of the battery, enabling the charging device to charge the battery with a second charging voltage and a second charging current, the second charging voltage having a value that is constant and that is equal to the maximum charging voltage value of the battery, the second charging current having a value that is continuously decreasing;
    F) when it is determined that the value of the second charging current is not greater than the first predetermined threshold value, enabling the charging device to charge the battery with a third charging voltage and the second charging current, the third charging voltage having a value that is constant and that is equal to the normal charging voltage value of the battery; and
    G) when it is determined that the value of the second charging current is not greater than a second predetermined threshold value, which is less than the first predetermined threshold value, disabling the charging device from charging the battery.

2. The charging method as claimed in claim 1, wherein, in step C), the internal resistance value is equal to a difference between the value of the first charging voltage and the actual voltage value divided by the actual current value.

3. The charging method as claimed in claim 1, wherein, in step D), the first predetermined threshold value is equal to a difference between the maximum charging voltage value and the normal charging voltage value divided by the internal resistance value.

4. The charging method as claimed in claim 1, wherein the second predetermined threshold value is obtained based on the discharge current value of the battery.

5. The charging method as claimed in claim 4, wherein the second predetermined threshold value is equal to one-twentieth of the discharge current value.

6. The charging method as claimed in claim 1, wherein the charging device stores a battery specification therein, which includes the normal charging voltage value, the maximum charging voltage value, and the discharge current value of the battery.

7. A charging device for a battery, comprising:
    a control unit stored with a battery specification therein, the battery specification including a normal charging voltage value, a maximum charging voltage value, and a discharge current value of the battery; and
    a charging unit coupled to and controlled by said control unit so as to charge the battery in
        a first charging mode, where said charging unit charges the battery with a first charging voltage and a first charging current, the first charging voltage having a value that is continuously increasing, the first charging current having a value that is constant and that is not greater than the discharge current value of the battery,
        a second charging mode when it is determined by the control unit that the first charging voltage is equal to the maximum charging voltage of the battery, which is greater than the normal charging voltage value of the battery, where said charging unit charges the battery with a second charging voltage and a second charging current, the second charging voltage having a value that is constant and that is equal to the maximum charging voltage value of the battery, the second charging current having a value that is continuously decreasing, and
        a third charging mode, where the charging unit charges the battery with a third charging voltage and the second charging current, the third charging voltage having a value that is constant and that is equal to the normal charging voltage value of the battery;
    wherein said control unit is adapted to receive an actual voltage value and an actual current value of the battery, and is operable
        through a first algorithm stored therein, to obtain an internal resistance value of the battery based on the value of the first charging voltage, and the actual voltage value and the actual current value received thereby, and
        through a second algorithm stored therein, to obtain a first predetermined threshold value, which is less than the discharge current value of the battery, based on the maximum charging voltage value, the normal charging voltage value, and the internal resistance value of the battery obtained thereby;
    wherein said charging unit is controlled by said control unit to charge the battery in the third charging mode only when the value of the second charging current is not greater than the first predetermined threshold value.

8. The charging device as claimed in claim 7, wherein the internal resistance value is equal to a difference between the value of the first charging voltage and the actual voltage value divided by the actual current value.

9. The charging device as claimed in claim 7, wherein the first predetermined threshold value is equal to a difference between the maximum charging voltage value and the normal charging voltage value divided by the internal resistance value.

10. The charging device as claimed in claim 7, wherein said control unit is further stored with a second predetermined threshold value therein, which is less than the first predetermined threshold value,
    said charging unit being disabled from charging the battery when the value of the second charging current is not greater than the second predetermined threshold value.

11. The charging device as claimed in claim 10, wherein the second predetermined threshold value is equal to one-twentieth of the discharge current value.

* * * * *

UNITED STATES PATENT AND TRADEMARK OFFICE
CERTIFICATE OF CORRECTION

PATENT NO. : 8,106,629 B2  
APPLICATION NO. : 12/115693  
DATED : January 31, 2012  
INVENTOR(S) : Ming-Feng Lai et al.

Page 1 of 1

It is certified that error appears in the above-identified patent and that said Letters Patent is hereby corrected as shown below:

Title Page, item (73);

Please delete the current assignee data:

"Universal Scientific Industrial Co., Ltd. (Nan-Tou Hsien, TW)"

And replace it with the correct assignee data:

Assignee 1: Universal Scientific Industrial (Shanghai) Co., Ltd. (Shanghai, CN)  
Assignee 2: Universal Global Scientific Industrial Co., Ltd. (Nantou, TW)

Signed and Sealed this  
Fourth Day of September, 2012

David J. Kappos  
*Director of the United States Patent and Trademark Office*